(12) United States Patent
Lin

(10) Patent No.: US 6,679,343 B2
(45) Date of Patent: Jan. 20, 2004

(54) CONTROL DEVICE FOR AN ELECTRIC SCOOTER

(76) Inventor: Samuel Lin, 6, Kung Yeh 2 Rd., Tou Chiao Industrial Park, Min Hsiung Hsiang, Chia Yi Hsien (TW)

( * ) Notice: Subject to any disclaimer, the term of this patent is extended or adjusted under 35 U.S.C. 154(b) by 15 days.

(21) Appl. No.: 10/046,692

(22) Filed: Jan. 17, 2002

(65) Prior Publication Data

US 2003/0132043 A1 Jul. 17, 2003

(51) Int. Cl.[7] .................... B60K 1/00; B60K 26/00; B60K 20/00; H02P 5/00; B62K 21/12
(52) U.S. Cl. ............... 180/65.1; 180/65.2; 180/315; 318/139; 74/485; 74/551.8; 74/473.12; 74/473.3
(58) Field of Search .................. 180/65.1, 65.8, 180/65.2, 216, 217, 218, 219, 220, 214, 315, 13, 211, 213; 318/139, 293, 280, 295; 74/484 R, 485, 488, 489, 491, 543, 548, 551.8, 473.1, 473.12, 473.3, 473.31, 552, 519, 566

(56) References Cited

U.S. PATENT DOCUMENTS

| | | | | | |
|---|---|---|---|---|---|
| 3,300,612 A | * | 1/1967 | Quayle | ....................... | 200/157 |
| 4,043,220 A | * | 8/1977 | Kolb | ........................... | 74/543 |
| 4,560,022 A | * | 12/1985 | Kassai | ........................ | 180/65.1 |
| 4,570,739 A | * | 2/1986 | Kramer | ....................... | 180/216 |
| 4,776,416 A | * | 10/1988 | Morse | ....................... | 180/65.1 |
| 5,125,468 A | * | 6/1992 | Coker | ......................... | 180/13 |
| 5,687,443 A | * | 11/1997 | Moore | ............................ | 15/98 |
| 5,701,968 A | * | 12/1997 | Wright-Ott et al. | ........ | 180/65.1 |
| 6,267,190 B1 | * | 7/2001 | Micheletti | ................... | 180/183 |

* cited by examiner

Primary Examiner—Brian L. Johnson
Assistant Examiner—Gerald Klebe
(74) Attorney, Agent, or Firm—Varndell & Varndell PLLC

(57) ABSTRACT

A control device for an electric scooter has a base, a potential regulator, a control lever, a torsion spring and a circuit board. The potential regulator is attached to the base. A rod is rotatably attached to the potential regulator to adjust a voltage sent out from the potential regulator. The control lever is securely attached to the rod. The torsion spring is mounted on the rod to provide a recoil force to the control lever. The circuit board is electrically connected to the potential regulator and the electric motor of the electric scooter. Accordingly, the voltage sent from the potential regulator can be adjusted by pushing the control lever. The circuit board can send current to the electric motor of the scooter based on the voltage sent from the potential regulator. Consequently, the electric motor can be caused to move forward or backward.

6 Claims, 5 Drawing Sheets

CONTROL DEVICE FOR AN ELECTRIC SCOOTER

BACKGROUND OF THE INVENTION

1. Field of the Invention

The present invention relates to a control device, and more particularly to a control device for an electric scooter, which can control the speed that the scooter move forward or backward.

2. Description of Related Art

An electric scooter is used to help a person, especially a debilitated person, to move from one place to another. The conventional electric scooter substantially comprises a frame, at least one front wheel, two rear wheels, an electric motor and a steering assembly. However, the conventional scooter can only move forward at one speed, but cannot move backward or at different speeds. The use of the conventional electric scooter is not versatile.

To overcome the shortcomings, the present invention tends to provide an control device to mitigate or obviate the aforementioned problems.

SUMMARY OF THE INVENTION

The main objective of the invention is to provide a control device to allow the electric scooter to move backward or at different speeds. The control device has a base, a potential regulator, a control lever, a torsion spring and a circuit board. The base is secured to the steering assembly of the electric scooter. The potential regulator is secured to the base. A rod is rotatably attached to the potential regulator to adjust voltage sent out from the potential regulator. The control lever is securely attached to the rod. The torsion spring is mounted on the rod to provide a recoil force to the control lever. The circuit board is electrically connected to the potential regulator and the electric motor of the electric scooter. With such a control device, the voltage sent from the potential regulator can be adjusted by rotating the rod by means of pushing the control lever. The circuit board can send positive current or negative current to the electric motor of the scooter depending on the voltage sent from the potential regulator. Accordingly, the electric motor can be rotated clockwise or counterclockwise to cause the scooter to move forward or backward. The use of the scooter becomes more versatile.

Other objects, advantages and novel features of the invention will become more apparent from the following detailed description when taken in conjunction with the accompanying drawings.

DETAILED DESCRIPTION OF PREFERRED EMBODIMENT

Figure 1:
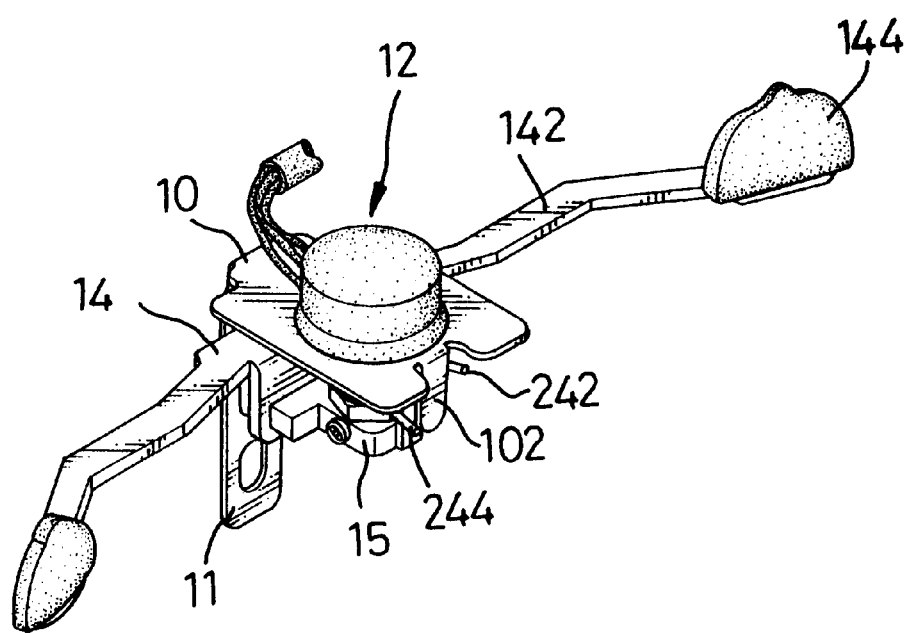
FIG. 1 is a perspective view of a control device for an electric scooter in accordance with the present invention.
Figure 2:
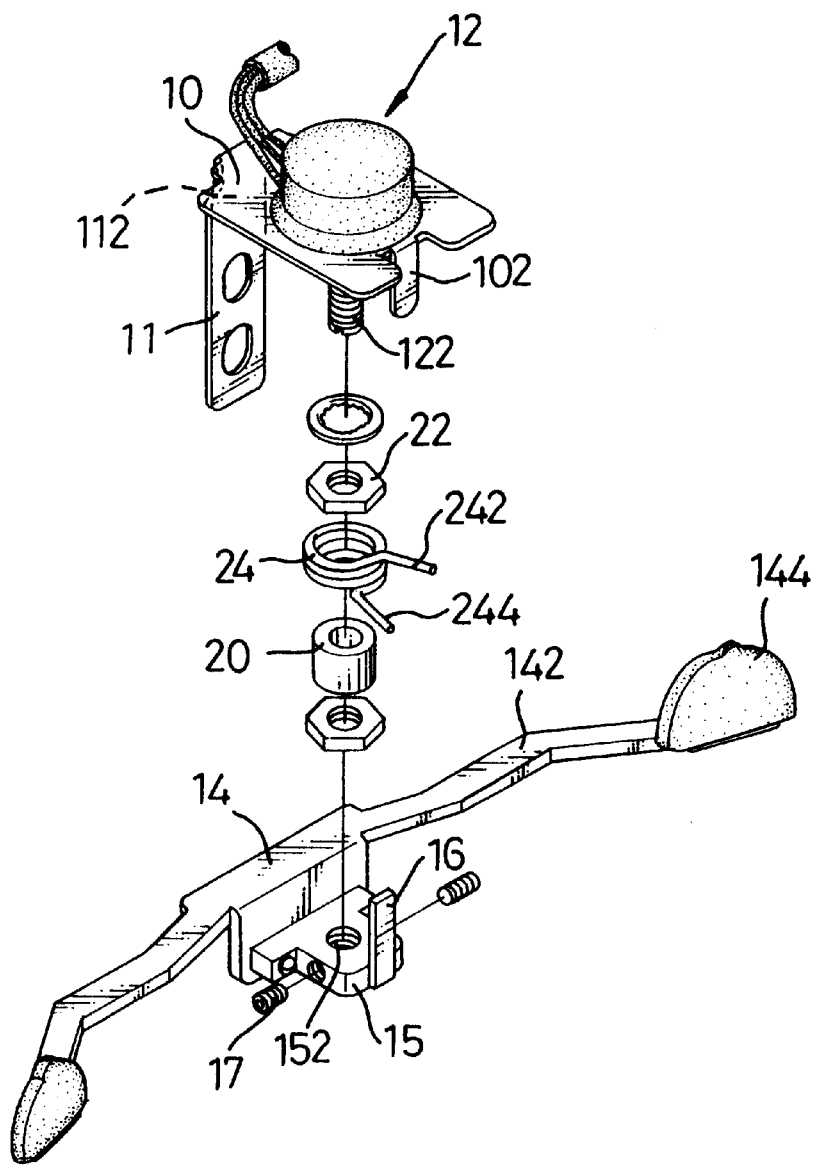
FIG. 2 is an exploded perspective view of the control device in FIG. 1.
Figure 3:
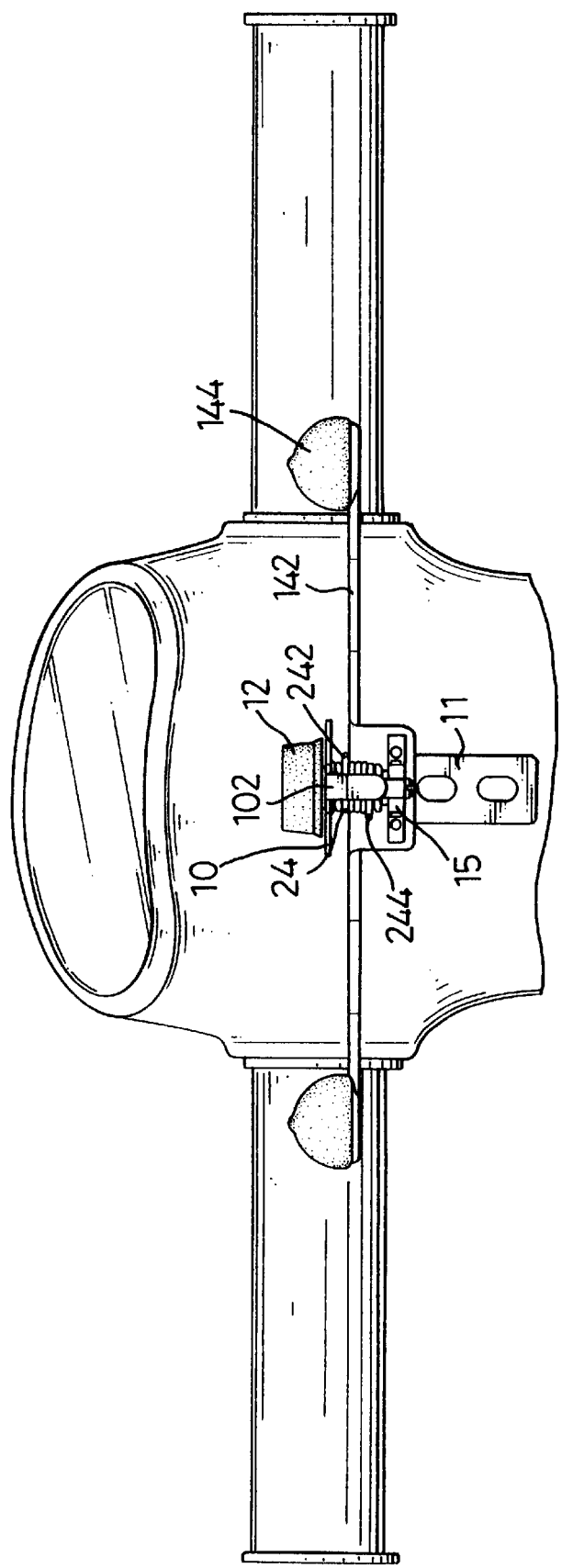
FIG. 3 is a partial rear plan view of a steering assembly of the electric scooter with the control device in FIG. 1.

With reference to FIGS. 1 to 3, a control device in accordance with the present invention comprises a base (10), a potential regulator (12), a control lever (14), a torsion spring (24) and a circuit board (not shown). The base (10) is attached to the steering assembly (not numbered) of the electric scooter. The base (10) has a top and a mounting plate (11) extending down perpendicular from one end of the top. The base (10) is attached to the steering assembly of the electric scooter with the mounting plate (11) and bolts (not shown). A notch (112) is defined in each side of the mounting plate (11) at the junction between the top of the base (10) and the mounting plate (11). A tongue (102) extends downward from the opposite end of the top of the base (10) from the mounting plate (11).

The potential regulator (12) is attached to the top of the base (10). The potential regulator (12) can send out various voltages. A rod (122) is rotatably attached to the potential regulator (12) to adjust the voltage sent out from the potential regulator (12).

The control lever (14) is securely attached to the rod (122) at a middle position of the control lever (14). Two arms (142) respectively and laterally extend from two sides of the control lever (14). A tab (144) vertically extends from the free end of each arm (142). With the aims (142), the tabs (144) can respectively face the handles of the steering assembly of the electric scooter.

A bracket (15) is secured to the control lever (14) with bolts (not numbered). A threaded hole (152) is defined in the bracket (15) to screw onto an external thread formed on the rod (122) of the potential regulator (12). Setscrews (17) are screwed into the bracket (15) and abut the rod (122), such that the control lever (14) is securely attached to the rod (122) with the threaded hole (152) in the bracket (15) and setscrews (17). An extension (16) is upwardly formed on the free end of the bracket (15).

The torsion spring (24) is mounted around the rod (122). The torsion spring (24) has two ends (242, 244) laterally extending from the spring (24). The two ends (242, 244) of the spring (24) extend in different directions so that a gap is defined between the two ends (242, 244) to receive the tongue (102) on the base (10) and the extension (16) on the bracket (15). A sleeve (20) is mounted around the rod (122), and the torsion spring (24) is mounted around the sleeve (20). Two nuts (22) are screwed onto the rod (122) of the potential regulator (12). Each nut (22) abuts one end of the sleeve (20) to securely position the sleeve (20) on the rod (122).

The circuit board (not shown) is electrically connected to the potential regulator (12) to receive the voltage signal. The circuit board is also electrically connected to the electric motor to send various currents to the electric motor depending on the voltage signal that the circuit board receives. In practice, the circuit board sends no current to the electric motor when circuit board receives a voltage signal from the potential regulator (12) in the middle range of the voltage that the potential regulator (12) can provide. For example, if the voltage range of the potential regulator (12) is 0 to 12 volt, the circuit board will send no current to the electric motor when the circuit board receives a voltage signal from the potential regulator (12) in the 5 to 7 volts range. When the potential regulator (12) sends a voltage signal of 8 to 12 volts to the circuit board, the circuit board will send various positive currents to the electric motor. When the potential regulator (12) sends a voltage signal of 0 to 4 volts to the circuit board, the circuit board will send various negative currents to the electric motor.

Figure 4:
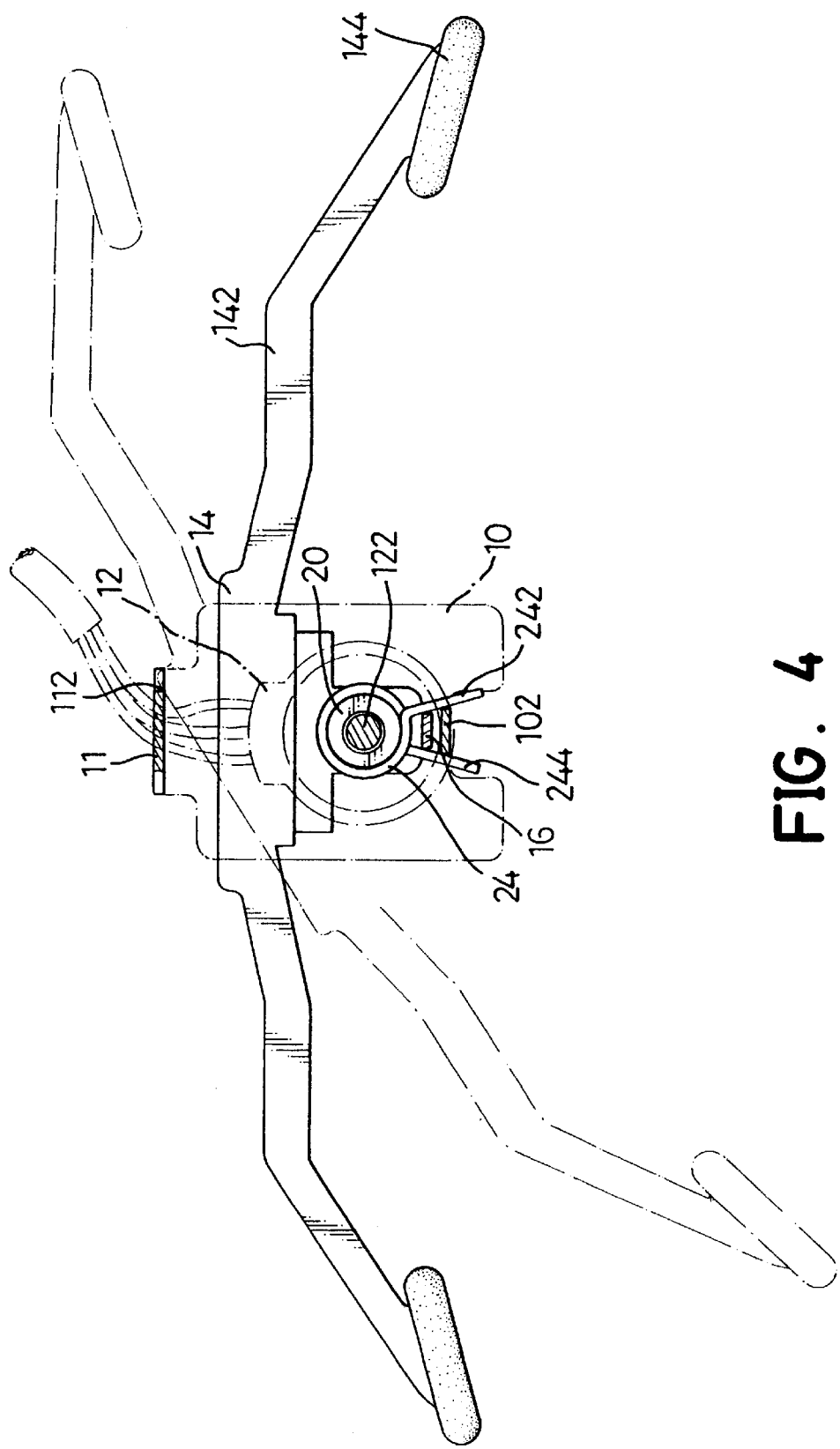
FIG. 4 is an operational top plan view in partial cross section of the control device in FIG. 1 showing the control lever pushed to cause the electric scooter to move forward.

With reference to FIGS. 2 to 4, when the scooter driver wants the scooter to move forward, he or she can push the tab (144) facing the right handle of the steering assembly. The control lever (14) will be rotated, and the rod (122) of the potential regulator (12) is also rotated. The extension (16) on the bracket (15) will push the first end (242) of the torsion spring (24) to rotate with the control lever (14), and the tongue (102) on the base (10) will stop the second end (244) of the torsion spring (24). The torsion spring (24) tightens. Accordingly, the voltage sent from the potential regulator (12) is changed. In practice, the voltage sent from the potential regulator (12) is enlarged when the rod (122) is rotated counterclockwise as shown in FIG. 4. The circuit board will send a positive current to the electric motor to actuate the electric motor. Consequently, the scooter can move forward.

When the driver release the tab (144), the control lever (14) with the rod (122) will rotate to the original position by the recoil force provided by the torsion spring (24). The voltage signal sent from the potential regulator (12) will recover to the middle range of voltage of the potential regulator (12). The circuit board will send no current to the electric motor, and the electric motor and the scooter are stopped.

Figure 5:
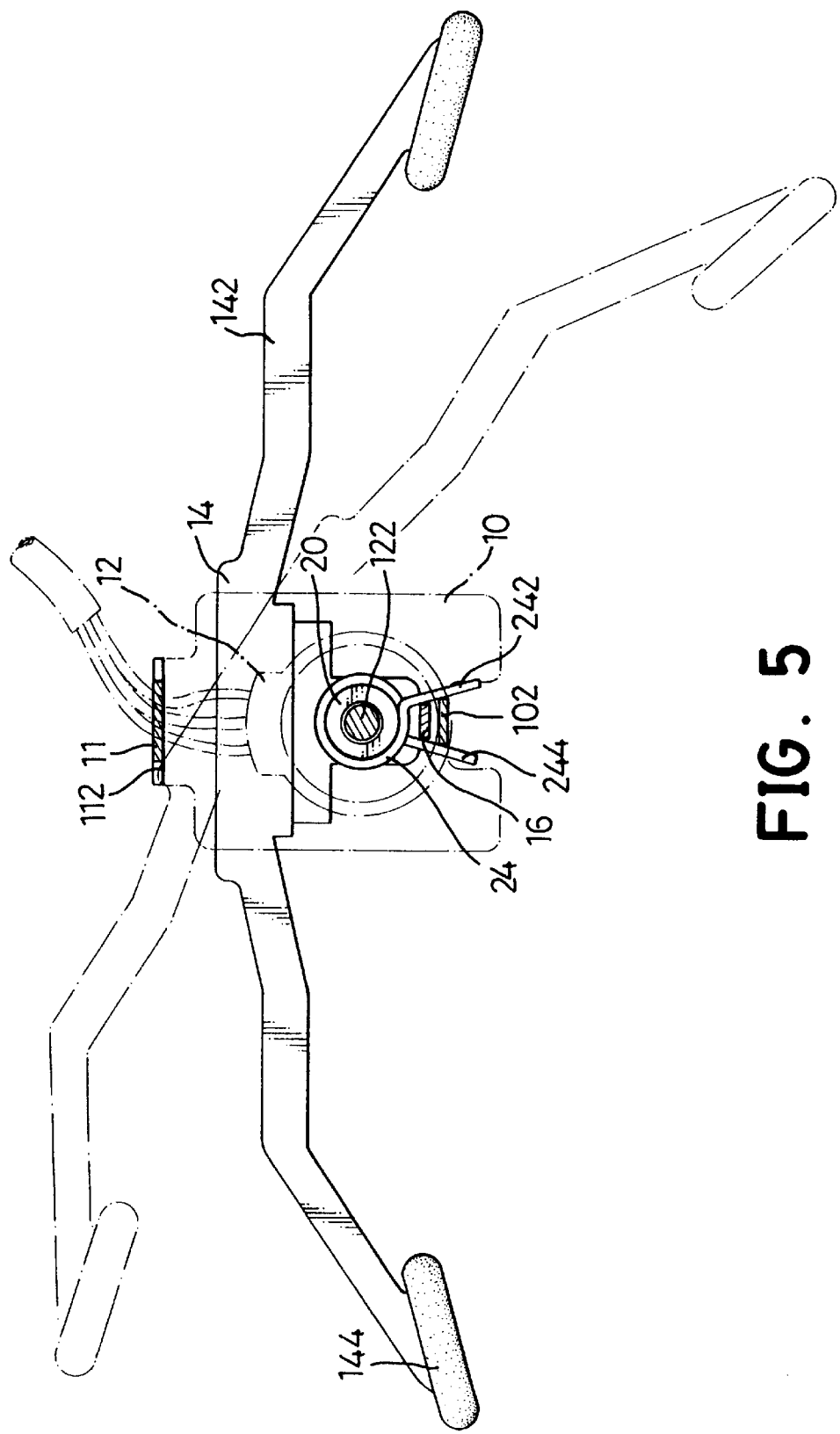
FIG. 5 is an operational top plan view in partial cross section of the control device in FIG. 1 showing that the control lever pushed to cause the electric scooter to move backward.

When the driver wishes the scooter to move backward, he or she pushes the other tab (144) facing the left handle of the steering assembly. With reference to FIGS. 2, 3 and 5, the control lever (14) with the rod (122) will be rotated clockwise as shown in FIG. 5. The extension (16) on the bracket (15) will push the second end (244) of the torsion spring (24) to rotate with the control lever (14), and the tongue (102) on the base (10) will stop the first end (242) of the torsion spring (24). The voltage sent from the potential regulator (12) is decreased, and the circuit board will send a negative current to the electric motor. Consequently, the scooter can move backward.

Therefore, the scooter can be selectively moved forward or backward by pushing the control lever (14). In addition, the current sent to the electric motor from the circuit board can be changed depending on the voltage sent from the potential regulator (12). The speed of the motor is changeable, such that the speed of the scooter is controllable. The use of the scooter becomes more versatile. Furthermore, the mounting plate (11) will stop the control lever (14) as one of the arms is received in the corresponding notch (112) in the mounting plate (11). This can limit the rotation of the control lever (14) and the voltage sent from the potential regulator (12), such that the current sent to the electric motor is also limited. The highest speed of the scooter is limited. The safety of driving the scooter is improved.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A control device for an electric scooter having a frame, an electric motor mounted on the frame and a steering assembly with two handles mounted on the frame, the control device comprising:

a base adapted to be mounted on the steering assembly of the electric scooter;

a potential regulator secured to the base to send out a voltage and having a rod rotatably attached to the potential regulator to adjust the voltage sent out from the potential regulator;

a control lever securely attached to the rod at a middle position of the control lever;

a torsion spring mounted on the rod to provide a recoil force to the control lever; and a circuit board electrically connected to the potential regulator to receive the voltage sent from the potential regulator and adapted to electrically connect with the electric motor to send current to the electric motor depending on the voltage sent from the potential regulator, wherein two arms respectively and laterally extend from two sides of the control lever; and a tab vertically extends from the free end of each arm and adapted to face one handle of the steering assembly of the electric scooter.

2. The control device as claimed in claim 1, wherein the base has a top to mount the potential regulator and a mounting plate extending down perpendicular from one end of the top.

3. The control device as claimed in claim 2, wherein the mounting plate has a notch defined in each side of the mounting plate at a junction between the top of the base and the mounting plate.

4. The control device as claimed in claim 1, wherein a bracket is secured to the control lever;

a threaded hole is defined in the bracket to screw onto an external thread formed on the rod of the potential regulator; and setscrews are screwed into the bracket and abut the rod to securely attach the control lever to the rod.

5. The control device as claimed in claim 1, wherein a tongue extends vertically from the base;

an extension vertically extends from the control lever; and the torsion spring has two ends laterally extending from the spring in different directions so as to define a gap between the two ends to receive the tongue on the base and the extension on the control lever.

6. The control device as claimed in claim 1 further comprising a sleeve mounted around the rod around which the torsion spring is mounted; and two nuts screwed onto the rod of the potential regulator and each abutting one end of the sleeve to secure the sleeve on the rod.

* * * * *